United States Patent
Doll

(10) Patent No.: US 10,434,657 B2
(45) Date of Patent: Oct. 8, 2019

(54) ROBOT FOR HANDLING GOODS IN TRANSIT AND CLEANING DEVICE THEREFOR AND OPERATING METHOD FOR OPERATING A ROBOT

(71) Applicant: IPR—INTELLIGENTE PERIPHERIEN FÜR ROBOTER GMBH, Schwaigern (DE)

(72) Inventor: Theo Doll, Schwaigern (DE)

(73) Assignee: IPR—INTELLIGENTE PERIPHERIEN FUER ROBOTER GMBH, Eppingen (DE)

( * ) Notice: Subject to any disclaimer, the term of this patent is extended or adjusted under 35 U.S.C. 154(b) by 174 days.

(21) Appl. No.: 15/315,916

(22) PCT Filed: Jun. 10, 2015

(86) PCT No.: PCT/EP2015/062979
§ 371 (c)(1),
(2) Date: Dec. 2, 2016

(87) PCT Pub. No.: WO2015/189293
PCT Pub. Date: Dec. 17, 2015

(65) Prior Publication Data
US 2017/0087724 A1    Mar. 30, 2017

(30) Foreign Application Priority Data
Jun. 13, 2014   (DE) .......................... 10 2014 211 397

(51) Int. Cl.
*B08B 9/00* (2006.01)
*B25J 11/00* (2006.01)
(Continued)

(52) U.S. Cl.
CPC ............. *B25J 11/0045* (2013.01); *B08B 9/00* (2013.01); *B25J 15/0014* (2013.01); *B25J 19/0058* (2013.01); *B25J 15/0061* (2013.01)

(58) Field of Classification Search
CPC ... B08B 15/02; B08B 3/02; B08B 9/00; B25J 19/0058
(Continued)

(56) References Cited

U.S. PATENT DOCUMENTS 5,232,299 A *   8/1993   Hiss .................. B08B 3/006
                                                    134/104.4
2011/0061690 A1 *  3/2011  Seger ................ B29C 33/72
                                                    134/137
(Continued)

FOREIGN PATENT DOCUMENTS

CN    203622451 U  *  6/2014
CN    205096169 U  *  3/2016
(Continued)

OTHER PUBLICATIONS

Machine translation of CN-203622451-U, dated Jun. 2014. (Year: 2014).*
(Continued)

*Primary Examiner* — Joseph L. Perrin
*Assistant Examiner* — Kevin G Lee
(74) *Attorney, Agent, or Firm* — Flynn Thiel, P.C.

(57) ABSTRACT

A robot for handling goods in transit having a movable fork unit with a load-bearing fork and a fork base relative to which the load-bearing fork can be translationally moved. The robot is provided with a cleaning device having a cleaning chamber which can be insulated from the surroundings, completely accommodates the load-bearing fork and at least partly accommodates the fork base. The cleaning device has an inlet opening for at least partial introduction (Continued)

of the fork unit into the cleaning chamber and an inflow opening for a cleaning agent, which opening leads to the cleaning chamber. The robot may be used for handling food items and beverages.

7 Claims, 3 Drawing Sheets

(51) Int. Cl.
*B25J 15/00* (2006.01)
*B25J 19/00* (2006.01)

(58) Field of Classification Search
USPC .......................................................... 134/175
See application file for complete search history.

(56) References Cited

U.S. PATENT DOCUMENTS

2012/0070263 A1* 3/2012 Van Schijndel ....... B65G 47/90
414/788.1
2012/0312329 A1* 12/2012 David .................... A21C 7/005
134/22.18

FOREIGN PATENT DOCUMENTS

| DE | 10 2011 003 303 A1 | 8/2012 | |
| DE | 102011003303 A1 * | 8/2012 | ............. B25J 15/04 |
| EP | 0425331 A1 * | 5/1991 | ............. B65B 69/00 |
| EP | 1 167 202 A1 | 1/2002 | |
| WO | WO 2010/047595 A1 | 4/2010 | |

OTHER PUBLICATIONS

International Search Report issued in Application No. PCT/EP2015/062979 with English translation, dated Oct. 27, 2015 (4 pages).
Written Opinion of International Searching Authority issued in Application No. PCT/EP2015/062979 dated Oct. 27, 2015.
Examination Report of German Patent Office issued in Application No. 10 2014 211 397.0 dated Feb. 5, 2015 (3 pages).

* cited by examiner

ROBOT FOR HANDLING GOODS IN TRANSIT AND CLEANING DEVICE THEREFOR AND OPERATING METHOD FOR OPERATING A ROBOT

The invention relates to a robot for handling goods in transit, in particular for combining goods in transit to form a common delivery batch on a pallet. The invention also relates to a cleaning device for a robot and to a cleaning method.

A generic robot has at least one movable fork unit comprising at least one load-bearing fork and at least one fork base, relative to which the at least one load-bearing fork can be moved translationally.

The invention also relates to a cleaning device for such a robot.

A generic robot is known from the prior art, in particular from WO 2010/047595 A1. The present invention relates in particular to the development of such a robot as is known from the aforementioned document. The disclosure content of WO 2010/047595 A1 is therefore incorporated in the disclosure content of this application by explicit reference, to the extent to which it relates to the robot and its mechanical components present for combining goods in transit.

Generic robots are used for handling goods in transit, in particular for the purpose of combining a large number of individual and to some extent different goods in transit to form a common batch on a pallet. This relates in particular to foodstuffs and beverages.

By means of the generic robot according to WO 2010/047595 A1 and by means of differently configured robots, it is possible to fill pallets with uniform or different goods in transit with high precision and at high speed. However, in practice it is hardly possible to avoid damage to the goods in transit also occurring here. In the event of damage, it is possible for the content of the damaged goods in transit, in particular foodstuffs, to come into contact with the mechanisms of the robot gripper and to cause faults. This applies in particular to high-sugar beverages which, as they dry, leave behind a sugar film, by means of which in particular the mobility of the load-bearing fork relative to the fork base is disrupted.

OBJECT AND ACHIEVEMENT

The object of the invention is to develop a generic robot to the effect that such faults can be eliminated quickly, so that when such a fault is present the robot gripper can quickly return to regular operation again.

According to the invention, this is achieved in that a generic robot is provided with a cleaning device. According to the invention, this cleaning device comprises a cleaning chamber which can be isolated from the surroundings, and which is designed to completely accommodate the load-bearing fork and at least partly accommodate the fork base. The cleaning device further comprises an access opening, through which the fork unit can at least partly be introduced into the cleaning chamber, and at least one inflow opening for cleaning liquid, which opens into the cleaning chamber.

The solution according to the invention of the problem recited at the start accordingly resides in providing a cleaning device which, without disassembling the robot or parts of the latter and preferably also without human intervention, is able to quickly eliminate a fault situation that has occurred. The cleaning device provided according to the invention is provided to permit the fork unit to be transferred into the cleaning chamber merely with the degrees of freedom possessed by the robot for moving the fork unit. For this purpose, the cleaning chamber is equipped with the aforementioned access opening, through which the robot can move the fork unit into the cleaning chamber. The cleaning device also has means in order, when arranging the fork unit or at least part thereof in the cleaning chamber, to isolate the same from the surroundings, so that cleaning liquid which can eliminate the contaminants from the fork unit can then be supplied. It is advantageous if the access opening points upward, so that the robot can at least partly arrange the fork unit in the cleaning chamber by lowering the same.

In order to isolate the cleaning chamber from the surroundings, the cleaning device preferably has a closing element in the manner of a cover or the like. Said closing element, of which preferably a plurality, in particular two, are provided, is designed to be movable between an open position and a closed position by a motor. In the closed position of the closing element or of the multiple closing elements, the latter isolate the cleaning chamber, wherein they close the access opening for this purpose, preferably together with the fork base. This should be understood to mean that the closing element or the closing elements, possibly together with an edge surrounding the access opening, define a cutout, which, with regard to its shape, is matched to the fork base or another part of the robot, so that, together with an outer contour of the fork base or of the aforementioned other part, the access opening can be closed sufficiently tightly in order effectively to prevent the escape of relatively large quantities of cleaning liquid.

It is particularly advantageous if a groove or a web pointing outward is provided on the outer side of the fork base, interacting with the closing element with a form fit when the latter is in its closed position. In this way, additional fixing of the fork unit in a cleaning position and a particularly good form of sealing of the cleaning chamber are achieved.

The fork base of a robot according to the invention is a subassembly, relative to which the at least one load-bearing fork can be moved translationally. Within this fork base, mechanical components are provided which are suitable to drive the load-bearing fork during its translational movement relative to the fork base. In particular in the region of these mechanical components, such as gear wheels or linear tooth systems, the contamination mentioned at the start is problematic. In order, in particular here, to achieve a high cleaning action being effected by the inflow of cleaning liquid, it is advantageous if the fork base has a housing with an inlet opening, through which cleaning liquid from outside can reach an interior of the fork base. The housing of the fork base that is designed in this way therefore has a specific access in order to guide the cleaning liquid from outside directly to locations particularly in need of cleaning.

In order that it is possible to arrange for cleaning liquid to flow in under pressure here, preferably, at least one of the inflow openings of the cleaning chamber is or can be arranged in the cleaning chamber in such a way that it can be coupled to the inlet opening of the fork base. The aforementioned inflow opening thus enters into a coupled connection with the inlet opening of the fork base as the fork unit is introduced into the cleaning chamber or after the fork unit has been introduced into the cleaning chamber. For this purpose, a peripheral sealing ring is preferably provided on the aforementioned inflow opening or on the inlet opening of the fork base, as a result of which it becomes possible to create a flow connection that is sealed relative to the outside merely by placing the inflow opening of the cleaning chamber on the inlet opening of the fork base.

A particularly simple way of implementing the aforementioned direct connection resides in placing the aforementioned inflow opening in a fixed location in the cleaning chamber in such a way that the connection is created merely by feeding in the fork unit. This can be achieved, for example, by the aforementioned inflow opening being arranged opposite the access opening of the cleaning device. If the access opening is provided on the upper side of the cleaning device, then the aforementioned inflow opening can open into the cleaning chamber from below and can be brought into contact with an inlet opening provided on the underside of the fork base when the fork unit is introduced into the cleaning chamber.

An additional or alternative configuration of the inflow opening for interacting with the inlet opening of the fork base provides for the aforementioned inflow opening to be movable relative to the cleaning chamber, that is to say, after the fork unit has been fed into the cleaning chamber, it moves onto the fork base, in order to couple thereto or to be placed thereon. A particularly advantageous implementation of the same provides for the inflow opening to be in a fixed location relative to the closing unit and, together with the latter, to be movable relative to the cleaning chamber and the fork unit arranged in the cleaning chamber. Such a configuration, following the introduction of the fork unit into the cleaning chamber as the access opening is closed, at the same time permits the fluid connection between the inflow opening of the cleaning chamber and the inlet opening of the fork base to be created. In this way, a simple design of the cleaning device can be achieved.

It has been established that the cleaning action can be increased if the intended relative movement between load-bearing forks and fork base is also possible in the cleaning chamber. Therefore, the cleaning chamber if preferably matched to the fork unit in such a way that the fork can also be moved within the cleaning chamber, preferably at least by 5 cm. It is particularly advantageous if the cleaning chamber is designed in such a way that the load-bearing fork is movable between the front and a rear end position within the cleaning chamber with the fork base stationary.

With regard to the control of the robot and of the cleaning processes, provision can be made for a control device of the robot to initiate a cleaning process regularly without any explicit recognition of need, by the fork units being fed to the cleaning device at a fixed or operation-dependent cycle rate. However, it is advantageous if such cleaning is carried out automatically but in a manner dependent on need. It is therefore advantageous if a robot according to the invention has sensors, by means of which moisture can be detected directly or indirectly. These sensors can in particular comprise a moisture sensor which is provided in the region of the fork unit and in particular preferably on the fork base. If, via this moisture sensor, moisture beyond a predefined threshold value is determined, then a cleaning process with the cleaning device provided in accordance with the invention is initiated. Instead of an explicit sensor, the motor control system of the robot can also be used. The increased friction which occurs in the event of contamination can be detected by monitoring the motor currents and can likewise be used to determine the need with regard to cleaning.

In order to be able to carry out and complete the cleaning process at high speed, it is advantageous if the cleaning device also has a drying device. This is preferably designed in such a way that it effects the drying via air flowing into the cleaning chamber. It is particularly advantageous if, in this case, use is made of the same inflow openings which have previously been used for supplying cleaning liquid.

During the drying, the already mentioned mobility of the load-bearing fork relative to the fork base is advantageous. By means of the simultaneous inflow of air and the movement of the load-bearing fork, it is possible to dry all parts of the fork unit in a short time.

The invention also relates to a cleaning device for a robot of the above-described type. This cleaning device comprises the components of the cleaning chamber that are provided in accordance with the invention and were mentioned at the start, including feed opening and the inflow opening for cleaning liquid.

The cleaning device preferably has the already mentioned closing element for closing the access opening, wherein said closing element can be moved between an open position and closed position by a motor. In particular, it is advantageous if at least one inflow opening can be moved relative to the cleaning chamber, wherein it can in particular preferably be connected to the closing unit for this purpose and, together with the latter, moved relative to the cleaning chamber.

The invention also relates to a method for cleaning a movable fork unit of a robot, wherein at least one of the following features is fulfilled:

The cleaning is carried out in a cleaning chamber, into which the robot at least partly introduces the fork base.

The cleaning is carried out by using a fluid connection which, during or following the introduction of the fork unit into the cleaning chamber, is created between an inflow opening of the cleaning chamber and an inlet opening of the fork base.

During the cleaning and/or during drying following the cleaning, the at least one load-bearing fork is moved relative to the fork base.

BRIEF DESCRIPTION OF THE DRAWINGS

Further advantages and aspects of the invention can be gathered from the claims and from the following description of a preferred exemplary embodiment of the invention, which will be explained below by using the figures. In the figures:

DETAILED DESCRIPTION OF THE EXEMPLARY EMBODIMENTS

Figure 1:
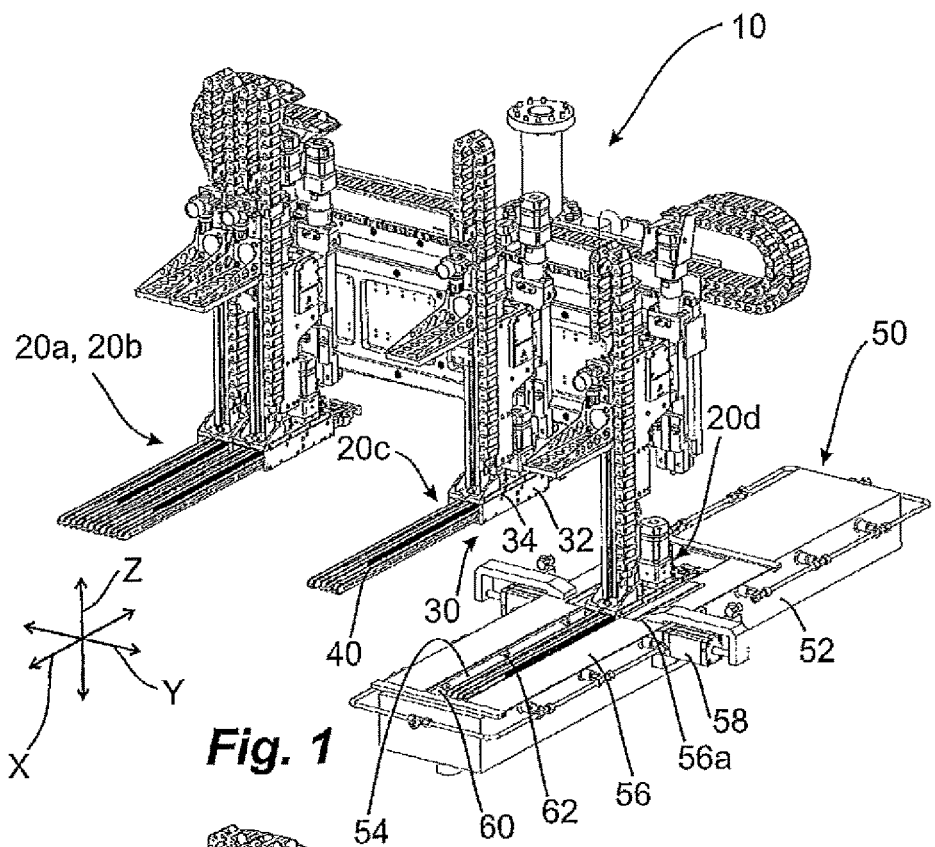
FIG. 1 shows a robot according to the invention during the feeding of a fork unit to a cleaning device.

FIG. 1 shows a part of a robot 10 for handling goods in transit with the purpose of combining these goods in transit to form a common delivery batch.

The robot 10 has a plurality of fork units 20a to 20d. Each fork unit can be moved as a whole in the Y direction and in the Z direction.

The fork units each have a fork base 30 that can be moved directly in the Z direction, and a load-bearing fork 40 which can be moved with respect thereto in the X direction.

By means of the multiplicity of load-bearing forks 40 that can be moved in all three spatial directions, the combining of goods in transit can be implemented in an advantageous way. Here, however, it is possible for damage to occur to goods in transit and, in particular in the case of sugar-containing beverages, for contamination of the robot 10 to occur. Such contamination takes place in particular on the load-bearing forks 40 and on the fork base 30. In particular when the load-bearing forks 40 in the already contaminated form are moved in the X direction relative to the respective fork base 30, contamination occurs within the outer housing 32 of the fork bases 30.

In order to eliminate such contaminants, a cleaning device 50 is provided. The latter has a housing 52, on the upper side of which an access opening 54 is provided. For the purpose of closing this access opening, two closing elements 56 that can be moved in the Y direction are provided and can be moved in an automated manner by means of motors 58. The closing elements 56 each have a cutout 56a. In the closed position, these cutouts 56a jointly form a free area which is matched to the outer contour of the fork bases 30.

For the purpose of cleaning the fork units 20a to 20d, the latter are lowered from above into a cleaning chamber 60 of the cleaning device 50 in the manner illustrated in FIG. 1. Then, by means of the motors 58, the closing elements 56 are moved toward each other, closing the cleaning chamber 60 very tightly. In order to avoid escape of cleaning liquid, peripheral sealing grooves 34, into which the closing elements 56 move with a form fit, are provided on the fork bases 30.

Figure 2:
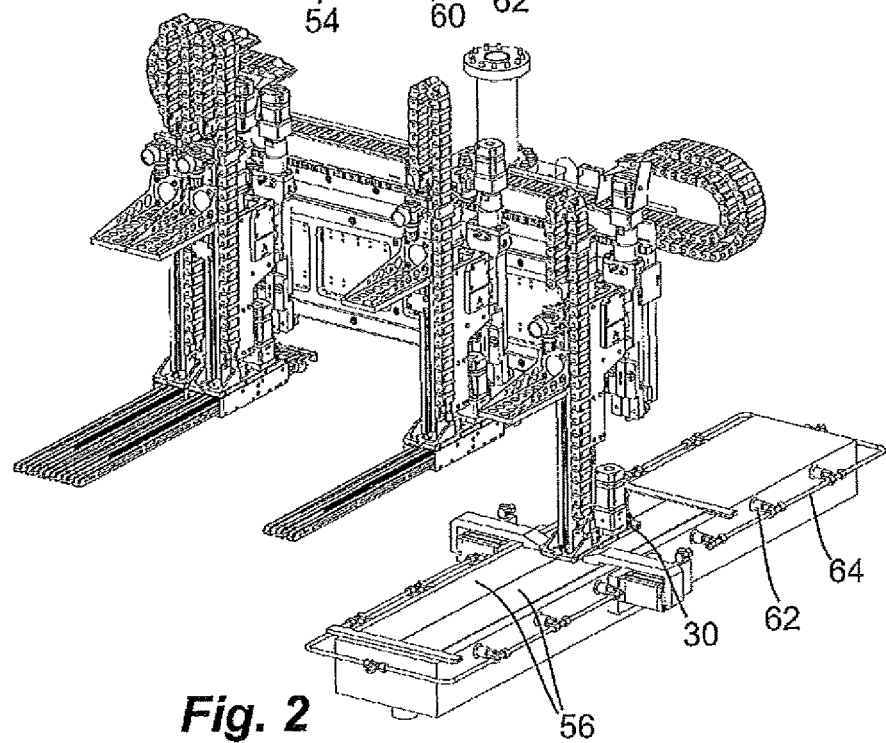
FIG. 2 shows the robot from FIG. 1 during the cleaning.

FIG. 2 shows the robot 10 during the cleaning process. The closing elements 56, together with the fork base 30, have sealed the cleaning chamber 60 tightly. Cleaning liquid is then led into the cleaning chamber 60 through inflow openings 62, wherein this inflow opening is fed through a line system 64 on the outside of the cleaning device 50.

The special configuration of the fork units 20a to 20d permits a faster cleaning process which will be explained by using the additional figures.

Figures 3A, 3B:
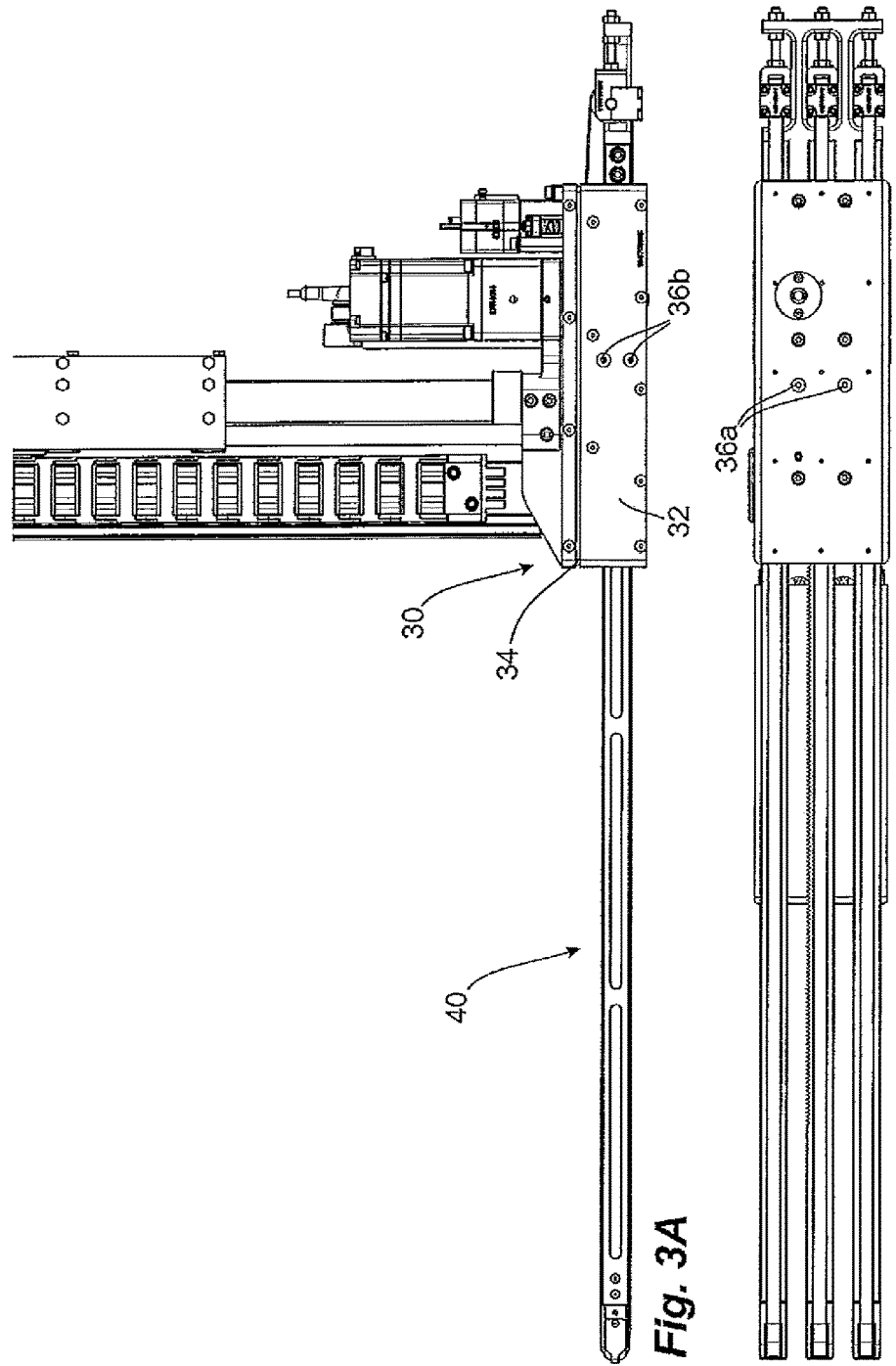
FIGS. 3A & 3B show a fork unit of the robot.

FIGS. 3A and 3B show a fork unit 20d in a side view and a view from below. Easily visible from the illustration of FIG. 3A is the sealing groove 34, into which the closing elements 56 move as the cleaning chamber 60 is closed. On the underside of the housing 32 of the fork base 30, two inlet openings 36a are additionally provided. On the side of the housing 32 which is illustrated in FIG. 3A, further inlet openings 36b are provided.

Figure 4A:
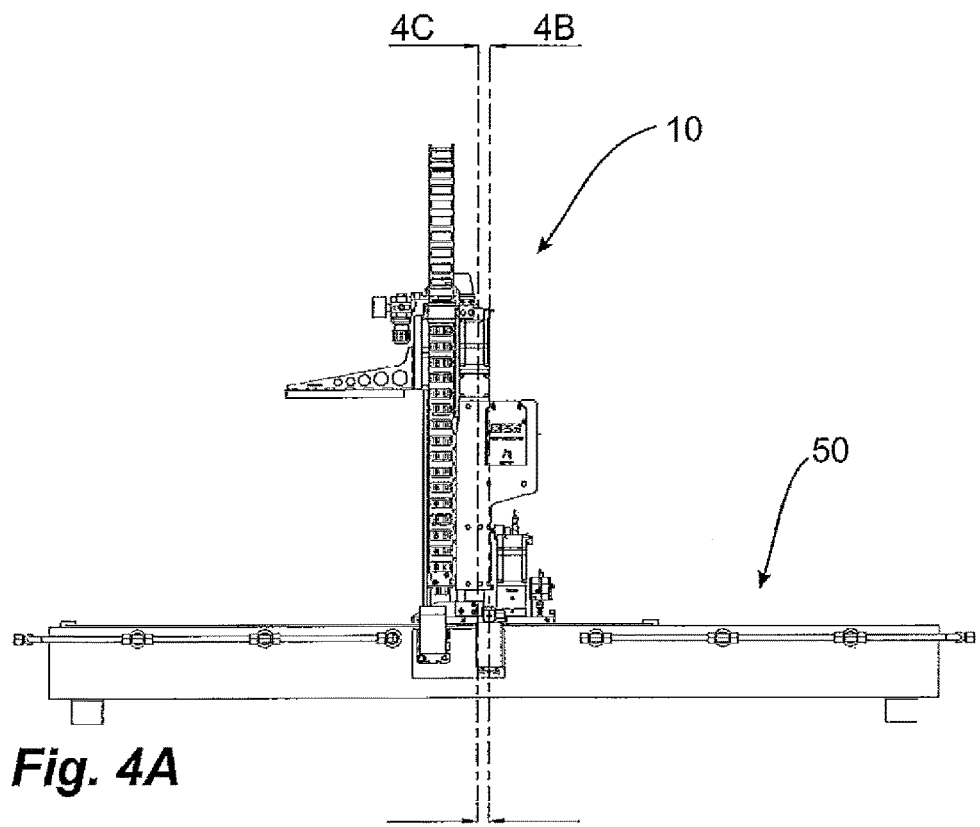
FIGS. 4A to 4C show the cleaning device with fork unit introduced in a side illustration and in two sectional illustrations arranged in different sectional planes.
Figure 4B:
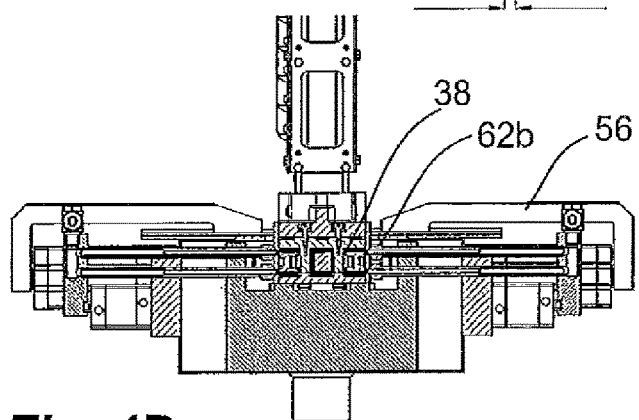
Figure 4C:
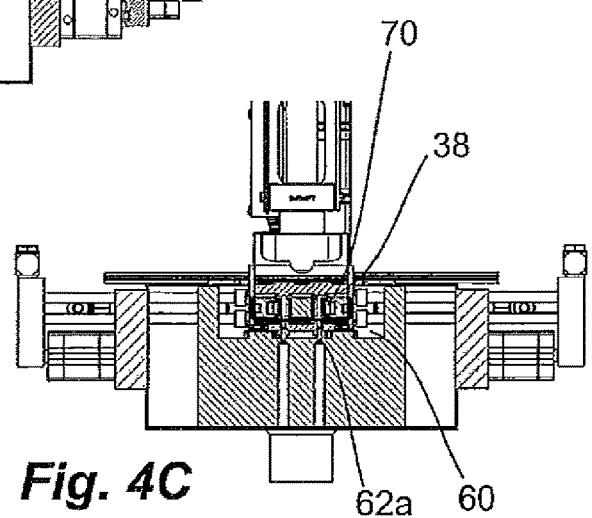

FIG. 4A shows the robot 10 and the cleaning device 50 in a side view. As they are moved into the cleaning chamber 60, the load-bearing forks 40 are in their front end position, in a way which can be seen in FIGS. 3A and 3B. As can be gathered from FIG. 4A, the cleaning device 50 and the cleaning chamber 60 provided in the latter have a size which permits the load-bearing forks 40 to move as far as an opposite, rear end position while the cleaning takes place or during drying after the cleaning. In FIG. 4A two sectional planes 4B, 4C for which corresponding sectional illustrations are illustrated in FIGS. 4B and 4C, are identified. FIG. 4C illustrates two inflow openings 62a, which are provided on the lower side of the cleaning chamber 60. When the fork unit 20d has been moved into the cleaning chamber 60, these two inflow openings 62a which, in a manner not specifically illustrated, are provided with peripheral seals, rest on the two inlet openings 36a which are illustrated in FIG. 3B.

Furthermore, in the manner which can be gathered from FIG. 4B, two inflow openings 62b, which are provided for coupling to the lateral inlet openings 36b of the housing 32 of the fork base 30, are provided in each case on both sides of the cleaning chamber 60. The special feature with regard to these inflow openings 62b resides in the fact that these are fitted to the closing elements 56 in a fixed location. Accordingly, they are moved together with the closing elements 56, which means that, in the state of FIG. 1, after the fork base 30 has been moved in and before the closing movement of the closing elements 56, they are still at a distance from the inlet openings 36b. Only in the course of moving the closing elements 56 into the closed position are they coupled to the inlet openings 36b.

Jointly, by means of the coupling to the inlet openings 36a and 36b, the cleaning liquid can be fed directly into an interior 38 of the fork base 30 during the cleaning process and contaminants can therefore be eliminated particularly well there. At the same time, cleaning of the load-bearing forks 40 is effected through the other inflow openings 62. Said forks are preferably moved during the cleaning in order to increase the cleaning action. On account of the fact that the load-bearing forks 40 can be moved from their front end position to their rear end position on account of the length of the cleaning chamber 60, a high cleaning effect can be achieved in particular by means of the direct feeding of cleaning liquid into the interior 38 of the fork base 30.

The cleaning is preferably completed by a drying process. Here, air is fed through some or all the inflow openings 62, 62a to 62b into the cleaning chamber 60, while, in particular, a continued movement of the load-bearing forks 40 relative to the fork base 30 preferably takes place.

The type of cleaning described can take place regularly in a robot according to the invention and without sensing the contaminated state. However, it is advantageous if such a contaminated state is detected by sensors provided for this. For this purpose, in the exemplary embodiment illustrated, a moisture sensor 70 is provided within the fork base 30. If the output value from this moisture sensor 70 exceeds a predefined threshold value, this is detected as contamination and the cleaning process is initiated.

The invention claimed is:

1. A robot for handling goods in transit, in particular for combining goods in transit to form a common delivery batch on a pallet, comprising:
   at least one movable fork unit having:
      at least one load-bearing fork; and
      at least one fork base, relative to which the at least one load-bearing fork can be moved translationally, the fork base having a housing with at least one inlet opening through which cleaning liquid from outside can reach an interior of the fork base;
   a cleaning device designed with a cleaning chamber which can be isolated from the surroundings, and which is designed to completely accommodate the load-bearing fork and at least partly accommodate the fork base, the cleaning device having an access opening for at least partial introduction of the fork unit into the cleaning chamber, and at least one inflow opening for cleaning liquid which opens into the cleaning chamber, the at least one inflow opening of the cleaning chamber being arranged in such a way that it can be coupled to the inlet opening of the fork base.

2. The robot as claimed in claim 1, wherein the cleaning device has at least one closing element for closing the access opening, which is movable between an open position and a closed position by a motor, wherein, in the closed position, the at least one closing element isolates the cleaning chamber from the surroundings together with the fork base.

3. The robot as claimed in claim 2, wherein the inflow opening which is provided for coupling to the inlet opening can be moved relative to the cleaning chamber, the inflow opening being in a fixed location relative to the closing element, and, together with the closing element, can be moved relative to the cleaning chamber.

4. The robot as claimed in claim 1, wherein the cleaning chamber is matched to the fork unit in such a way that the load-bearing fork can be moved translationally relative to the fork base within the cleaning chamber, between a rear and a front end position.

5. The robot as claimed in claim 1, wherein the robot has sensors by which moisture can be detected directly or indirectly, wherein the sensors have a moisture sensor in the region of the fork unit or on the fork base.

6. The robot as claimed in claim 1, wherein the cleaning device has a drying device, wherein the drying device is designed for drying via inflowing air, and wherein the cleaning device is designed for feeding air in through the inflow opening through which cleaning liquid or air can be fed.

7. A method for cleaning a movable fork unit of a robot, comprising:

providing a robot having at least one movable fork unit with at least one load-bearing fork and at least one fork base, relative to which the load-bearing fork can be moved translationally, the fork base having a housing with at least one inlet opening through which cleaning liquid from outside can reach an interior of the fork base, the robot further including a cleaning device designed with a cleaning chamber which can be isolated from the surroundings, and which is designed to completely accommodate the load-bearing fork and at least partly accommodate the fork base, the cleaning device having an access opening for at least partial introduction of the fork unit into the cleaning chamber, and at least one inflow opening for cleaning liquid which opens into the cleaning chamber, the at least one inflow opening of the cleaning chamber being arranged in such a way that it can be coupled to the inlet opening of the fork base, wherein:

cleaning is carried out in the cleaning chamber, into which the robot at least partly introduces the fork base;

the cleaning is carried out via a fluid connection which, during or after partial introduction of the fork unit, via the access opening, into the cleaning chamber is created between the inflow opening of the cleaning chamber and the inlet opening of the fork base; and during the cleaning, the load-bearing fork is moved relative to the fork base.

\* \* \* \* \*